Aug. 24, 1965        W. C. CARLYLE        3,202,881
ELECTRICAL PANELBOARD ENCLOSURE
Filed Aug. 2, 1961                         4 Sheets-Sheet 1
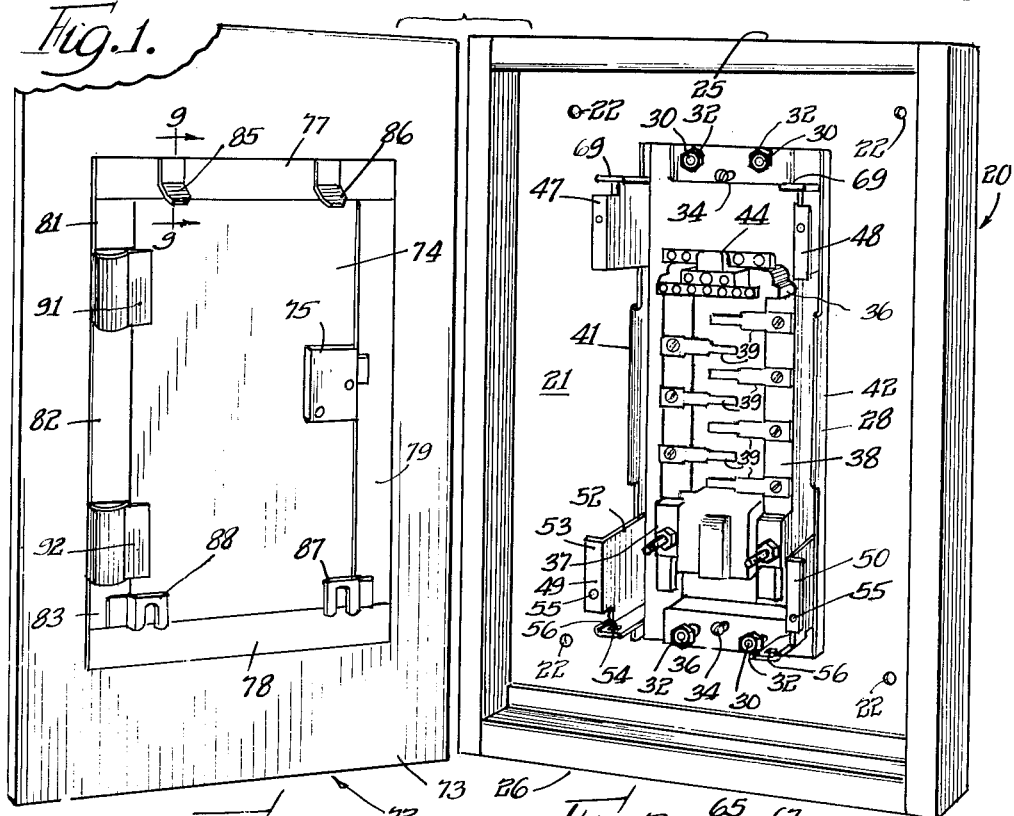
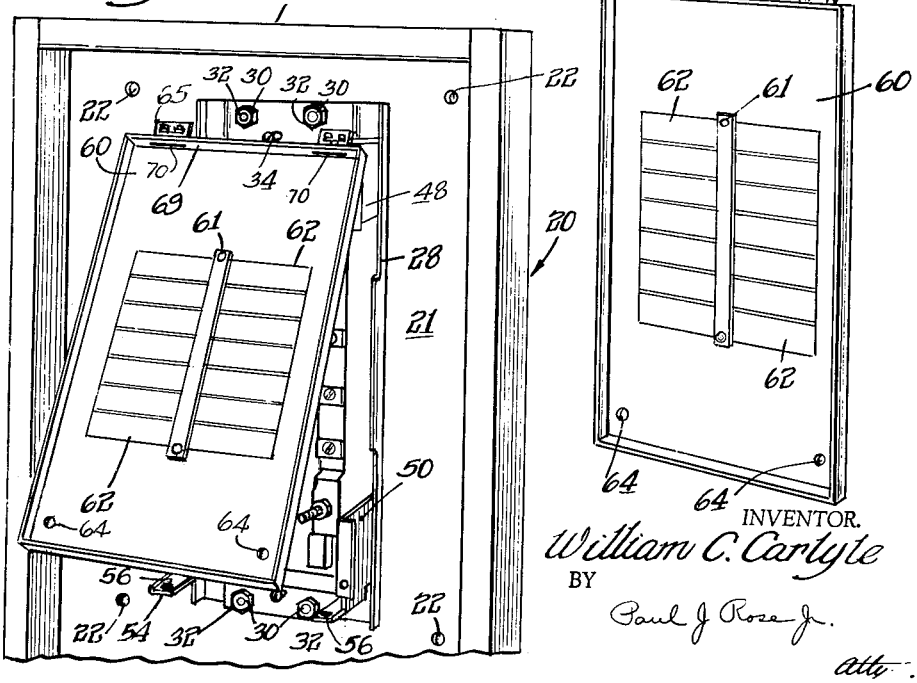
INVENTOR.
William C. Carlyle
BY
Paul J. Rose Jr.
atty.

Aug. 24, 1965  W. C. CARLYLE  3,202,881
ELECTRICAL PANELBOARD ENCLOSURE
Filed Aug. 2, 1961  4 Sheets-Sheet 2
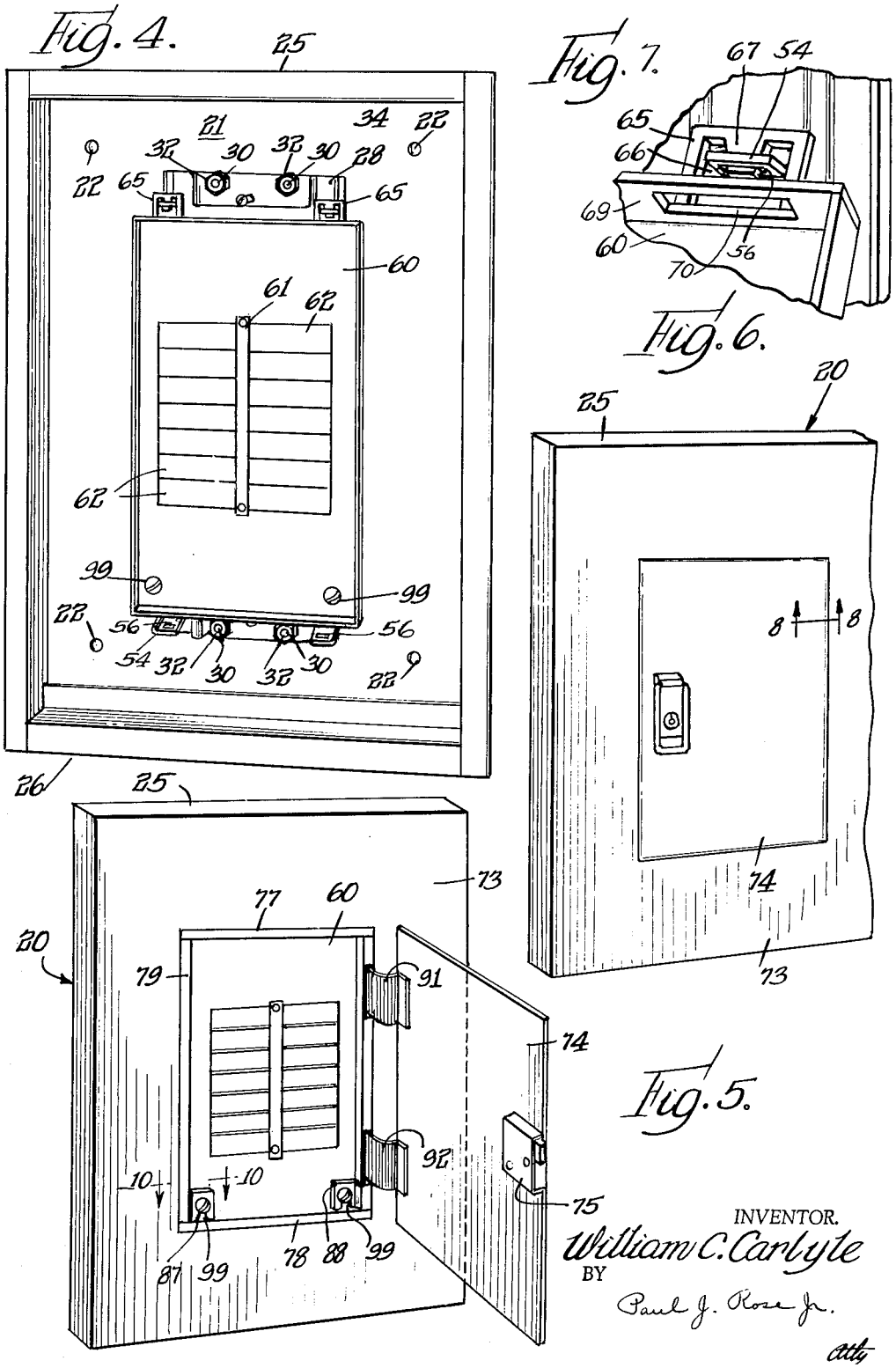
INVENTOR.
William C. Carlyle
BY
Paul J. Rose Jr.
Atty Aug. 24, 1965  W. C. CARLYLE  3,202,881
ELECTRICAL PANELBOARD ENCLOSURE
Filed Aug. 2, 1961  4 Sheets-Sheet 3
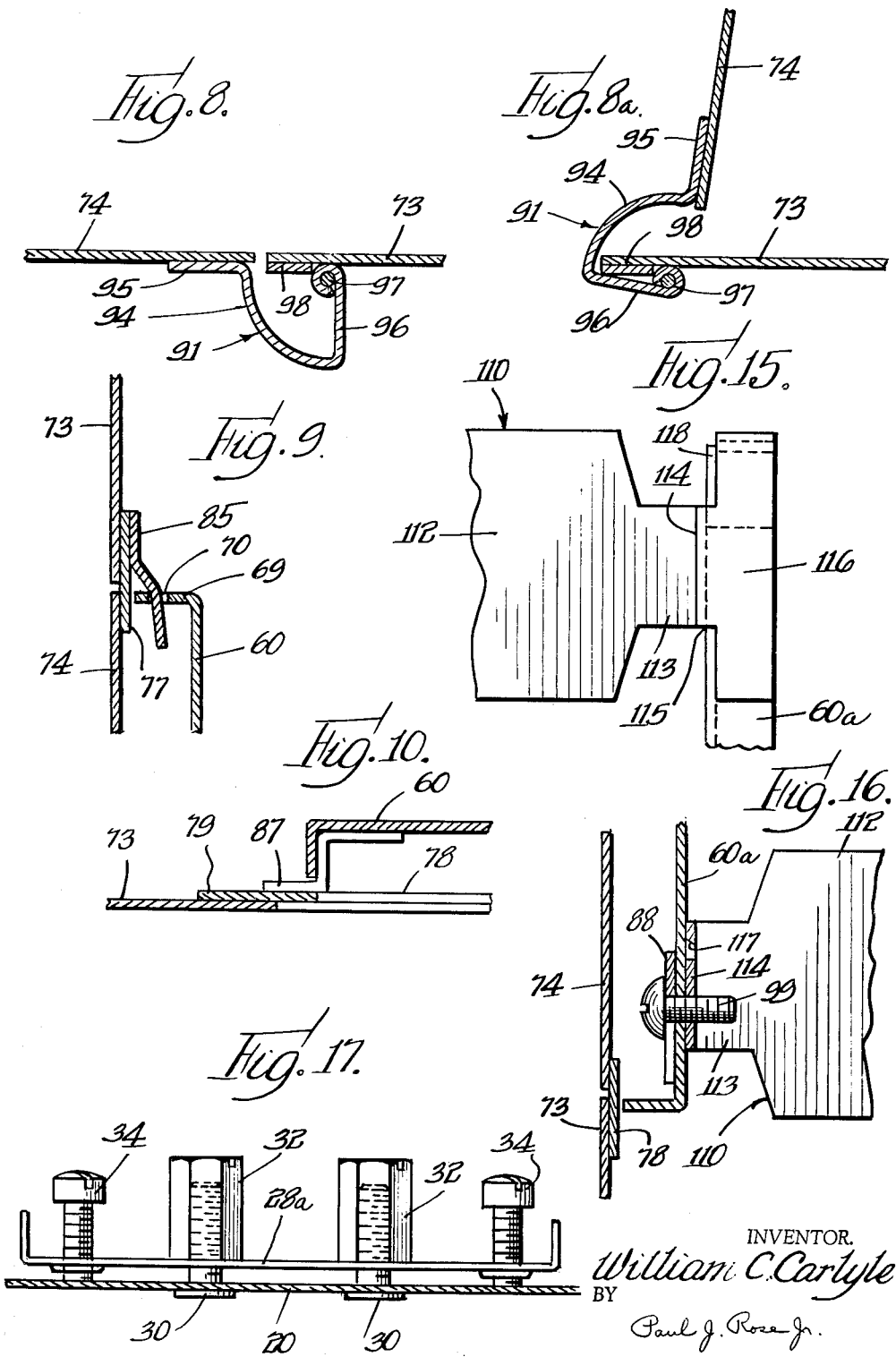
INVENTOR.
William C. Carlyle
BY
Paul J. Rose Jr.
Atty.

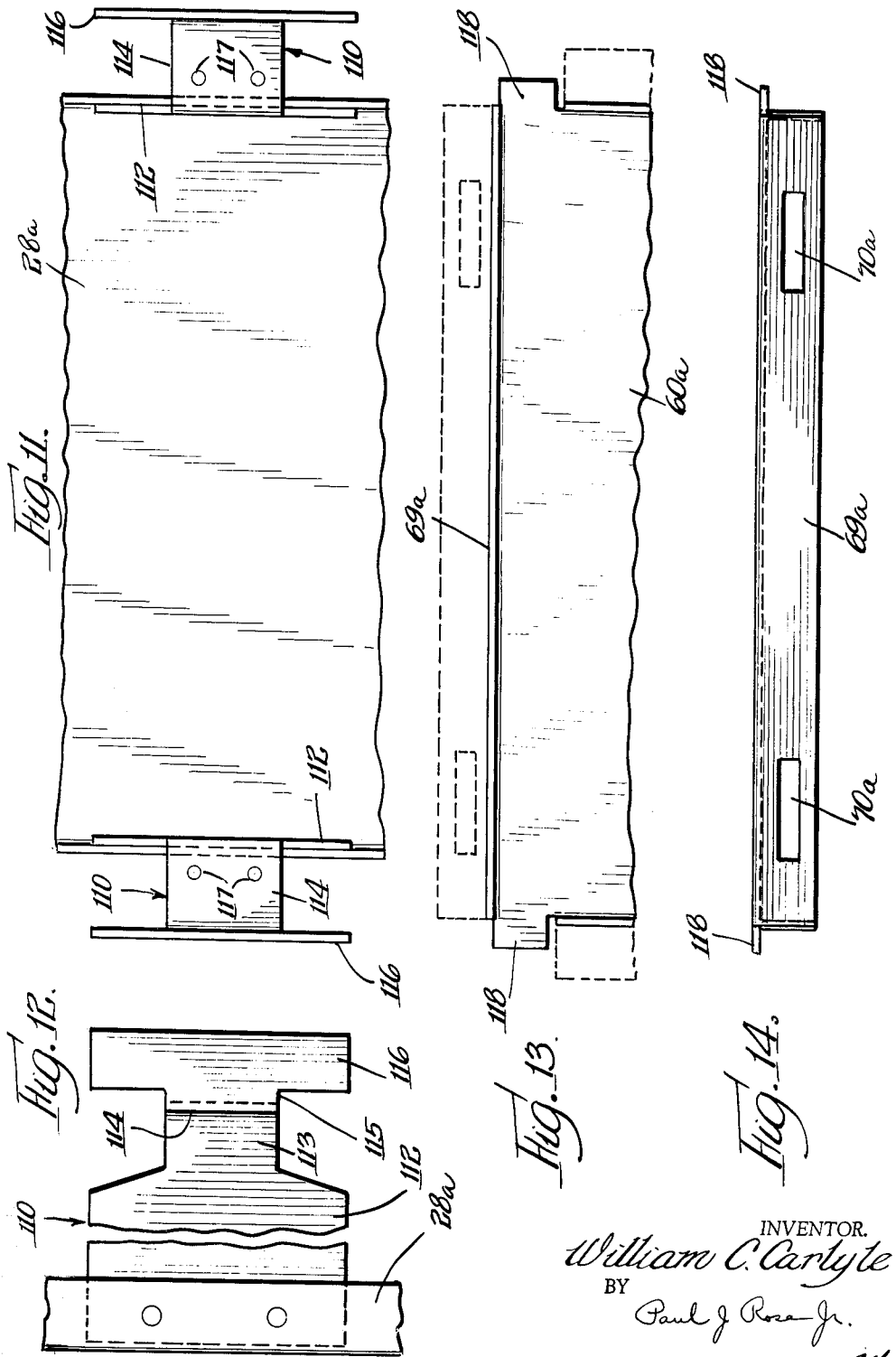

United States Patent Office 3,202,881
Patented Aug. 24, 1965

3,202,881
ELECTRICAL PANELBOARD ENCLOSURE
William C. Carlyle, Toronto, Ontario, Canada, assignor to Square D Company, Park Ridge, Ill., a corporation of Michigan
Filed Aug. 2, 1961, Ser. No. 128,722
2 Claims. (Cl. 317—119)

This invention relates generally to electrical panelboards, and more particularly to the enclosures therefor.

The principal object of the invention is to provide an improved construction for an electrical panelboard enclosure wherein an exterior trim and door assembly is provided with concealed door hinges and concealed trim fastening means.

Other objects of the invention will appear from time to time as the following specification proceeds and with reference to the accompanying drawings wherein:

FIGURE 1 is a perspective view of an electrical panelboard constructed in accordance with the invention and showing a box and a mounting pan assembly secured therein and also showing the inner side of an exterior trim and door assembly standing next to the box.

FIGURE 2 is a perspective view of an interior trim plate constructed in accordance with the invention;

FIGURE 3 is a perspective view of the interior trim plate being mounted on the mounting pan assembly;

FIGURE 4 is a perspective view of the box and mounting pan assembly from the front, showing the interior trim plate mounted in place;

FIGURE 5 is a perspective view of the box with the exterior trim and door assembly secured in place and the door open;

FIGURE 6 is a view similar to FIGURE 5, but with the door closed;

FIGURE 7 is an enlarged view of an upper right portion of FIGURE 3, showing a portion of the interior trim plate as it is being mounted on the upper right bracket of the mounting pan assembly;

FIGURE 8 is a fragmentary sectional view taken in the direction of arrows 8—8 of FIGURE 6 and illustrating the hinge between the exterior trim and door when the door is in closed position;

FIGURE 8a is a view like FIGURE 8, but with the door in open position;

FIGURE 9 is a fragmentary sectional view taken in the direction of arrows 9—9 of FIGURE 1 and illustrating one of the bent mounting tongues welded on the exterior trim adjacent the top of the door opening therein and further showing a portion of the interior trim plate, a mounting bracket thereof being omitted;

FIGURE 10 is a fragmentary sectional view taken in the direction of arrows 10—10 of FIGURE 5 and illustrating one of the mounting brackets welded on the exterior trim adjacent the bottom of the door opening therein;

FIGURE 11 is a fragmentary view showing a front portion of a modified mounting pan assembly;

FIGURE 12 is a side view of the mounting pan assembly of FIGURE 11;

FIGURE 13 is a front view of the top portion of an interior trim plate for use with the mounting pan assembly of FIGURE 11;

FIGURE 14 is a top view of the interior trim plate of FIGURE 13;

FIGURE 15 is a fragmentary view showing an upper portion of the interior trim plate of FIGURE 13 mounted on one of the upper brackets of the mounting pan assembly of FIGURE 11;

FIGURE 16 is a fragmentary sectional view illustrating the securing of the interior trim plate and the exterior trim and door assembly to one of the lower brackets of the mounting pan assembly of FIGURE 11; and FIGURE 17 is a fragmentary view, partially in section, illustrating an alternate method for adjustably mounting a mounting pan assembly on the back of the box.

The embodiment of the invention shown in FIGURES 1 through 10 will first be described. A sheet metal box or enclosure is generally indicated by numeral 20. A back wall portion 21 of the box 20 is provided with mounting holes 22 to facilitate mounting of the box on a vertical surface. Top and bottom wall portions 25 and 26 are provided with the usual knockouts (not shown) for the connection of electrical conduit to the box.

In a manner well understood in the art, a mounting pan assembly 28 is adjustably mounted on the back wall portion 21. For example, four threaded studs or mounting screws 30 are inserted through suitable apertures in the back wall portion 21 so that their shank portions form mounting studs extending outwardly from the back wall portion 21. (Note a similar arrangement in a modified mounting pan assembly 28a of FIGURE 17.) The mounting pan assembly 28 is provided with four corresponding apertures to enable mounting thereof on the mounting screws 30 and four nuts 32 are provided to hold the mounting pan assembly in place. Additionally, the mounting pan assembly 28 is provided with threaded holes to receive elevating screws 34 which bear against the back wall portion 21. It will be understood that the nuts 32 can be backed off the mounting screws 30 and the elevating screws 34 then turned to move the mounting pan assembly outwardly from the back wall portion 21.

An insulative base 36 is secured to the mounting pan assembly 28 in any suitable manner. The base 36 is provided with a pair of main bus bars 37 and 38 adapted to be connected to a source of electric power, branch bus bars 39 adapted to support electrical circuit breakers mountable thereon and on beaded portions 41 and 42 of the mounting pan assembly 28, and a neutral bar assembly 44, all as well understood in the art.

The mounting pan assembly 28 has four brackets 47, 48, 49, and 50 welded to upturned side edges thereof. As can be seen in FIGURE 1, the bracket 47 is identical to the bracket 50, though inverted relative thereto. Similarly, the bracket 48 is identical to the bracket 49, though inverted relative thereto. In addition, the brackets 48 and 49 are symmetrical to the brackets 47 and 50.

The bracket 49 has a main portion 52 welded at one end to a side edge of the pan of the mounting pan assembly 28, an outwardly extending flange 53 generally parallel to the back wall portion 21 of the box 20 and extending from the end of the main portion 52 opposite the welded end, and an inwardly extending flange 54 generally perpendicular to the back wall portion 21 and extending from an edge of the main portion 52 remote from the bracket 47. The flange 53 is provided with a threaded hole 55 and the flange 54 is provided with a slot 56 adjacent the outer end thereof. As noted above, the bracket 48 is identical and the brackets 47 and 50 are symmetrical to the bracket 49.

An interior trim plate 60 is shown in FIGURE 2. An indicia strip 61 is riveted thereto, and a series of knockouts 62 is provided on each side of the indicia strip for removal to permit projection of the handles of installed circuit breakers beyond the front of the interior trim plate. A pair of mounting holes 64 is provided adjacent the lower edge of the plate 60, and a pair of flat mounting brackets 65 is welded to the back of the plate 60 adjacent the upper edge thereof. The brackets 65 are provided with generally U-shaped apertures 66 and depending tongue portions 67. The plate 60 may be formed from flat stock and provided with bent-up edges or side flanges as shown. The upper edge or top flange 69 is provided with a pair of slots 70, one of which is best shown in FIGURE 7 (see also FIGURE 14, showing similar slots 70a).

An exterior trim and door assembly 72 is shown standing adjacent the box 20 in FIGURE 1. The exterior trim and door assembly 72 and box 20 are not hingedly connected, but they may be secured to each other in the manner hereinafter described.

The exterior trim and door assembly 72 includes an exterior trim 73 having a rectangular opening therethrough and a door 74 hinged to the trim 73 and adapted to close the rectangular opening. A lock 75 is provided on the door 74. Rabbets or steel strips are welded to the trim 73 around the door opening on the inside to form a door stop and help keep out dust. For example, an upper rabbet 77, a lower rabbet 78, and a side rabbet 79 may each be in one piece. The rabbet along the other side of the door opening is broken away at the hinges, so that the other side rabbet is in three separate pieces 81, 82, and 83, as shown. The upper rabbet 77 has a pair of bent mounting tongues 85 and 86 welded thereto. A pair of slotted mounting brackets 87 and 88 are welded to the side rabbets 79 and 83 adjacent the lower ends thereof, respectively.

A pair of contoured hinge portions 91 and 92 is welded to the door 74. FIGURES 8 and 8a more clearly depict the hinge construction. Since the hinges are identical, only the upper one will be described. Thus, the hinge portion 91 is movable and includes an arcuate portion 94 joining a straight portion 95 welded to the door 74 and a straight portion 96 extending substantially perpendicularly to the portion 95 and pivotally connected as by a pin 97 to a stationary hinge portion 98 welded to the trim 73. It will be understood that the stationary hinge portion 98 and the straight portion 96 of the movable hinge portion 91 have curved interleaving ends extending around the pin 97. It will be seen from FIGURE 6 that the construction provides hinges which are concealed so as not to be visible from the outer side of the door 74 when the door is closed.

It will also be seen from FIGURE 6 that no screws extend through the trim 73 to secure it in position on the box 20, whereby a neat appearance is presented. The trim 73 is secured by means of the previously described construction in the manner now to be set forth.

FIGURES 3 and 7 show the interior trim plate 60 in the process of installation, it being understood that a knockout 62 would first be removed for each circuit breaker installed on the bus bars 39. The plate 60 is hung on the brackets 47 and 48 by means of the mounting brackets 65, being first maneuvered so that the flanges of brackets 47 and 48 corresponding to the flange 54 of the bracket 49 enter the apertures 66 and then lowered so that the tongue portions 67 enter the slots corresponding to the slot 56 of the bracket 49. The lower end of the plate is then swung inwardly to bear against the flange 53 of the bracket 49 and the corresponding flange of the bracket 50 and respectively align the holes 64 of the plate 60 with the threaded hole 55 of the bracket 49 and the corresponding threaded hole of the bracket 50. A pair of screws 99 is then inserted respectively through the holes 64 and partially threaded into the threaded holes such as the hole 55, as shown in FIGURE 4.

The exterior trim and door assembly 72 is then mounted by inserting the mounting tongues 85 and 86 respectively into the slots 70 of the top flange 69 of the interior trim plate 60 (see FIGURE 9) and at the same time sliding the slotted mounting brackets 87 and 88 over the screws 99, as shown in FIGURE 5. (Note also FIGURE 16, showing a nearly identical arrangement.) Tightening the screws 99 completes the installation. The opposite end portions of the brackets 87 and 88 are offset as best shown in FIGURE 10, the amount of the offset being substantially equal to the width of the flanges of the interior trim plate 60.

FIGURES 11 through 16 show modifications of the mounting pan assembly 28 and the interior trim plate 60. Thus, FIGURES 11 and 12 show a portion of a mounting pan assembly 28a similar to the mounting pan assembly 28, but having four identical brackets 110 in place of the brackets 47, 48, 49, and 50. Each bracket 110 has a main portion 112 welded at its lower end to an upturned side edge of the pan of the mounting pan assembly 28a and cut away at its upper end to provide a neck portion 113 from which an offsetting portion 114 of the same width as the neck portion 113 extends at substantially right angles. The offsetting portion 114 is joined at its other end to a short extension 115 of substantially the same width as the offsetting portion 114 but extending at right angles thereto for a distance substantially equal to the thickness of an ear 118 of a modified interior trim plate 60a to be described. The short extension 115 terminates at its other end in a wider retaining portion 116 of substantially the same width as and substantially parallel to the main portion 112. A pair of holes 117 is provided in each offsetting portion 114.

FIGURES 13 and 14 show the upper portion of the modified interior trim plate 60a, which is identical to the previously described interior trim plate 60, except that the brackets 65 of plate 60 have been omitted and a pair of ears 118 have been provided adjacent the top flange 69a, the bent-up edges or side flanges of the plate 60a terminating adjacent the ears 118. The broken lines of FIGURE 13 indicate flanges of the formed blank before they are bent up.

FIGURE 15 illustrates how the upper portion of the interior trim plate 60a is mounted on an upper pair of brackets 110 of the modified pan assembly 28a of FIGURES 11 and 12. It will be seen that the back of the plate 60a rests against the offsetting portions 114 of the upper pair of brackets 110 while the ears 118 rest on the upper edges of the extensions 115 and are retained thereon by the upper ends of the retaining portions 116. Exclusive of the ears 118, the plate 60a fits between the retaining portions 116 of the upper pair of brackets 110 and also between the retaining portions 116 of a lower pair of brackets 110 of the mounting pan assembly 28a.

FIGURE 16 illustrates how the lower portion of the interior trim plate 60a is secured to the lower pair of brackets 110 of the mounting pan assembly 28a, the section being taken through one of the screws 99 which is threaded into one of the holes 117 in the offsetting portion 114 of a bracket 110. As in the previously described construction, the screw 99 also secures the bracket 88 of the trim 73.

FIGURE 17 shows how the mounting pan assembly 28a is adjustably secured to the box 20. The arrangement is like that described for the mounting pan assembly 28, except that two elevating screws 34, rather than one, are provided adjacent the top and bottom of the mounting pan assembly 28a, and they are spaced outwardly of, rather than between, the nuts 32.

It will be seen that I have provided an improved construction for a panelboard enclosure wherein the fastening means for the exterior trim is concealed and the door hinges are also concealed when the door is closed.

Various modifications may be made in the structure shown and described without departing from the spirit and scope of the invention.

I claim:

1. An electrical panelboard comprising an open-front box, a pair of threaded studs extending inwardly of said box respectively through upper and lower portions of a back wall portion of said box, a mounting pan assembly loosely mounted in said box on said studs, said mounting pan assembly having means for mounting electrical control devices thereon, a pair of nuts adjustably threaded on said studs to hold said mounting pan assembly thereon, a pair of screws adjustably threaded respectively in upper and lower portions of said mounting pan assembly and bearing against said back wall portion of said box to hold said mounting pan assembly outwardly from said back wall portion and against said nuts, the adjustability of said nuts and screws enabling said mounting pan assembly to be rigidly but adjustably secured in spaced relationship to said back wall portion of said box, a separate interior trim plate mountable on said mounting pan assembly, cooperative means respectively on an upper portion of said mounting pan assembly and on spaced upper portions of said interior trim plate for establishing a fixed axis of pivotal movement therebetween when said interior trim plate is mounted on said mounting pan assembly, an exterior trim and door assembly separate from said interior trim plate but mountable thereon and including an exterior trim panel having a generally rectangular door opening therein and a door hinged to said exterior trim panel adjacent an edge of said door opening, cooperative means respectively on an upper portion of said interior trim plate and on spaced upper portions of said exterior trim panel for establishing a fixed axis of pivotal movement therebetween when said exterior trim and door assembly is mounted on said interior trim plate, and fastening means securing the lower portion of said interior trim plate to said mounting pan assembly, said fastening means also securing the lower portion of said exterior trim panel to said mounting pan assembly and being concealable by said door.

2. An exterior trim and door assembly for an open-front box of an electrical panelboard, said assembly comprising a generally flat exterior trim panel having a generally rectangular door opening therein, a door for covering said door opening, and hinge means pivotally securing said door to said exterior trim panel, said hinge means including a generally flat stationary hinge part secured to an inner surface of said exterior trim panel adjacent an edge of said door opening and having a stationary hinge curl disposed in spaced relationship to said edge of said door opening, a movable hinge part including a generally flat portion secured to an inner surface of said door adjacent an edge thereof corresponding to said edge of said door opening, a generally arcuately curved portion extending from said flat portion generally concentrically of said stationary hinge curl, and a connecting portion extending from said curved portion to said stationary hinge curl and having a movable hinge curl axially aligned with said stationary hinge curl, and a pin connecting said hinge curls.

References Cited by the Examiner

UNITED STATES PATENTS

| | | | |
|---|---|---|---|
| 1,769,645 | 7/30 | Hummelgard | 16—172 |
| 2,634,319 | 4/53 | Kingdon | 317—119 |
| 2,871,284 | 1/59 | Wills | 317—119 |

JOHN F. BURNS, *Primary Examiner.*